Patented June 23, 1925.

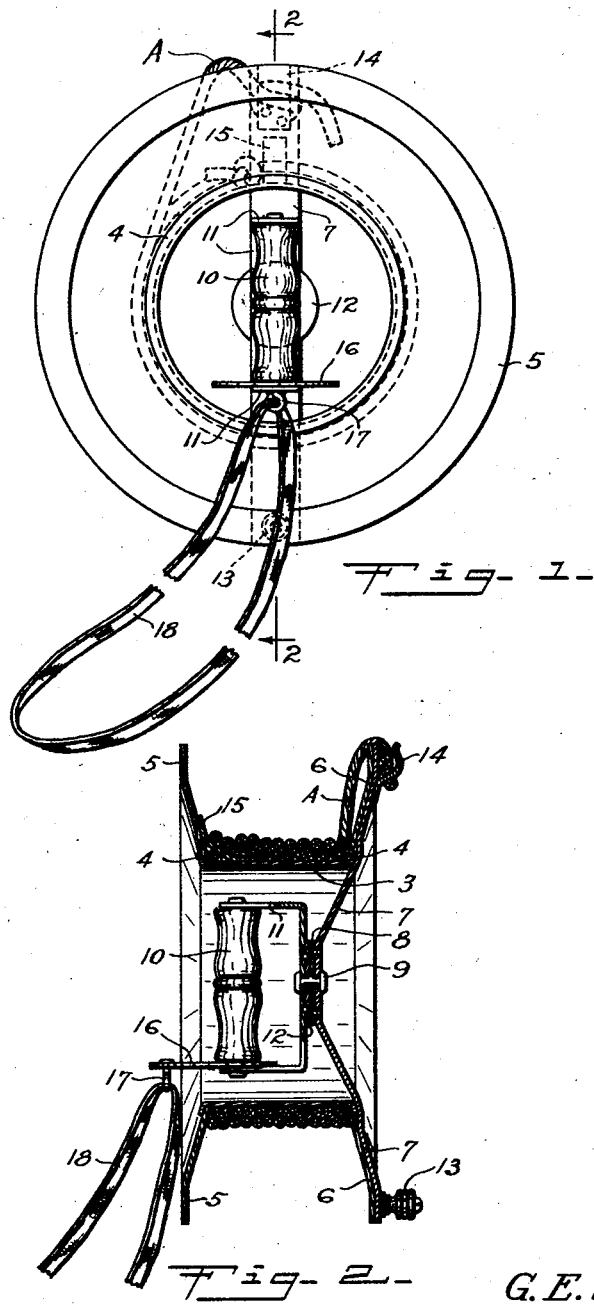

1,543,489

UNITED STATES PATENT OFFICE.

GEORGE E. WILSON, OF OMAHA, NEBRASKA.

HAND REEL.

Application filed January 16, 1925. Serial No. 2,931.

*To all whom it may concern:*

Be it known that I, GEORGE E. WILSON, a citizen of the United States, residing at Omaha, in the county of Douglas and State of Nebraska, have invented certain new and useful Improvements in Hand Reels, of which the following is a specification.

My invention relates to portable, manually supported and operated reels, for use with cordage, flexible wire and the like. It is the object of my invention to provide a reel of simple, durable and inexpensive construction, and of comparatively large capacity, having a handle which may be grasped with one hand to support the device, while the other hand of the user is employed to rotate the spool, to wind a line thereon or to control the unwinding of the line therefrom. A more particular object of my invention is to so construct and arrange the rotary spool and the handle that the latter is substantially at the center of gravity of the device as a whole, whereby the same may be held in any desired position, with a minimum of fatigue to the user. A further object is to provide, in connection with the handle, a member adapted to extend slightly past the wrist-joint and engage the forearm of the user, whereby to reduce the strain of the wrist-joint when the reel is held with its axis horizontal or at a moderate inclination from the horizontal.

In the accompanying drawing Fig. 1 is a side view of a reel embodying my invention, and Fig. 2 is an axial section of the same.

In carrying out my invention I construct a reel-body or spool, preferably of sheet-metal, having a relatively large central or axial opening. In the structure shown, the spool comprises a cylindrical tubular member 3 having short flanges 4 turned outwardly at the ends thereof, and to said flanges 4 are secured the inner edges of the annular end-plates 5 and 6. The central portions of said plates 5 and 6 are dished inwardly, so that the space between their peripheral portions is greater than the length of the center-tube 3. A metal bar or strap 7 is extended diametrically across the outer side of the end-plate 6, said bar being shaped to conform with the dished contour of the plate, and the portion which extends across the end of the center-tube 3 being bowed inwardly, a short central portion of the bar being straight and having a circular bearing-plate 8 secured thereto. To said central portion of the cross-bar 7 is affixed a pin or rivet 9 which is coaxial with the spool. A grip or handle 10 has the ends thereof secured to the ends of a U-shaped bar 11, the middle portion of said U-bar extending parallel with said grip 10 and having secured thereto a circular bearing-plate 12 similar to the plate 8 on the cross-bar 7. The center-pin 9 extends through coincident openings in the plate 12 and U-bar 11, the pin being revoluble therein, so that the spool may be rotated while the grip or handle is held stationary. The cross-bar 7 is secured to the end-plate 6 by suitable means such as spot-welds (not shown), and at one end of the bar a small crank-handle 13 is connected therewith. Near the other end of the cross-bar a hook 14 is provided for use in connecting to the spool the outer end of the rope A or other flexible line wound upon the same. For attaching to the spool the inner end of the line, cord or rope, there is provided an angle-strap 15 extending across the inner corner between the center-tube 3 and the end-plate 5. At one end of the U-bar 11 and extending outwardly from the grip 10, there is secured an extension-plate 16 which projects out far enough to engage the forearm adjacent to the wrist-joint, when the hand is closed about the grip. Said plate 16 facilitates holding of the reel in a horizontal position without causing fatigue of the wrist. At the lower side of the plate 16 an eye 17 is provided, to which a looped flexible strap 18 is connected as shown.

In the use of the reel the strap 18 may be placed over the shoulder of the user, so that when desired the reel may be supported from the strap, and both hands of the user left free. When winding the line upon the reel the grip 10 may be held with either hand, and the crank-handle 13 grasped with the other hand for turning the spool. The handle or grip is substantially at the center of gravity of the entire device, and by reason thereof the reel may be carried, moved about, and held in any desired position, with a minimum of effort, as the weight is substantially in balance about the center of the support, and there is no tendency to tilt or swing about the support as would be the case were the handle located at one side of the reel. The wrist-plate 16 further facilitates the holding of the reel in an axially horizontal position for winding the line thereon or unwinding the same therefrom, by reducing the tendency of the supported weight to cause bending of the wrist-joint.

It will be seen that the described reel is of such construction as to be capable of manufacture at a very low cost, while being durable and efficient in operation, and of light weight proportional to the amount of line which may be wound thereon. The reel is especially suitable for use with clothes-lines, and enables such lines to be strung or taken down without twisting or kinking the same, and without allowing the line to sag, so as to touch the ground and become soiled.

Now, having described my invention, what I claim and desire to secure by Letters Patent is:

1. In a device of the class described, a spool comprising a tubular center-member and annular end-plates secured to the ends of said center-member, a cross-bar extending diametrically of one of said end-plates and bowed into the adjacent end of the tubular center-member, a handle disposed within the center-member and having a grip transverse to the axis thereof, and a pin secured to said cross-bar and extending coaxially of the spool, said pin being connected rotatably with said handle.

2. A hand reel, comprising a spool having a large axial opening, a bar fixedly secured to the spool and extending transversely adjacent to one end of the axial opening, a handle disposed wholly within the axial opening of the spool and substantially at the center of gravity of the spool, said handle having a grip transverse to the spool-axis, and means rotatively connecting said handle and bar at the spool-axis.

3. In a hand reel, a spool having a large axial opening and a member extending across said opening at one end thereof, a handle disposed within the axial opening, said handle having a grip transverse to the spool-axis, means rotatively connecting said handle and the spool, and a wrist-plate secured to the handle and projecting outwardly from one end of the grip, for the purpose set forth.

4. In a structure as set forth in claim 2, a crank-handle attached to the bar near one end thereof, and a line-attaching device at the other end of said bar.

GEO. E. WILSON.